O. W. TUCKER & J. R. SHIRLEY.
PORTABLE WATER HEATER.
APPLICATION FILED MAR. 27, 1911.

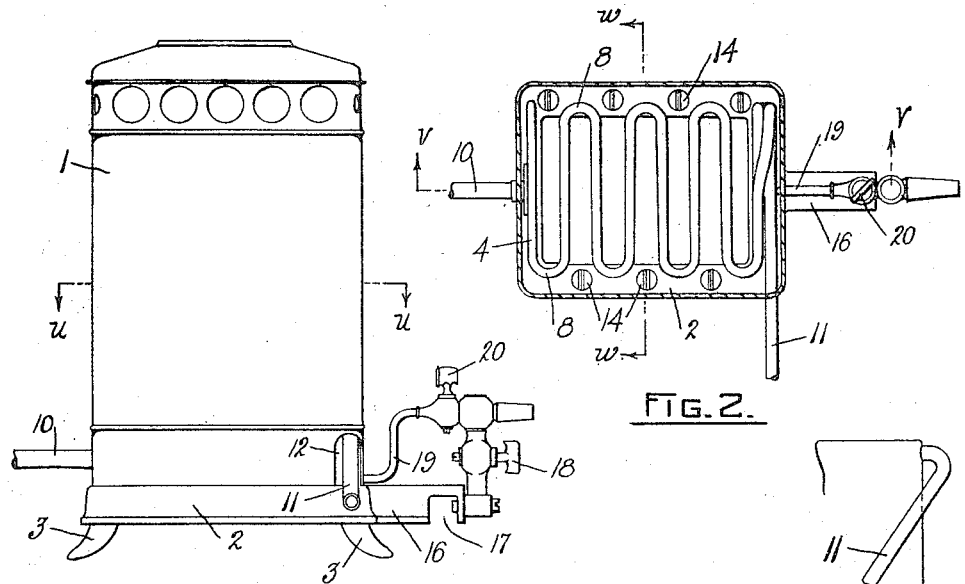
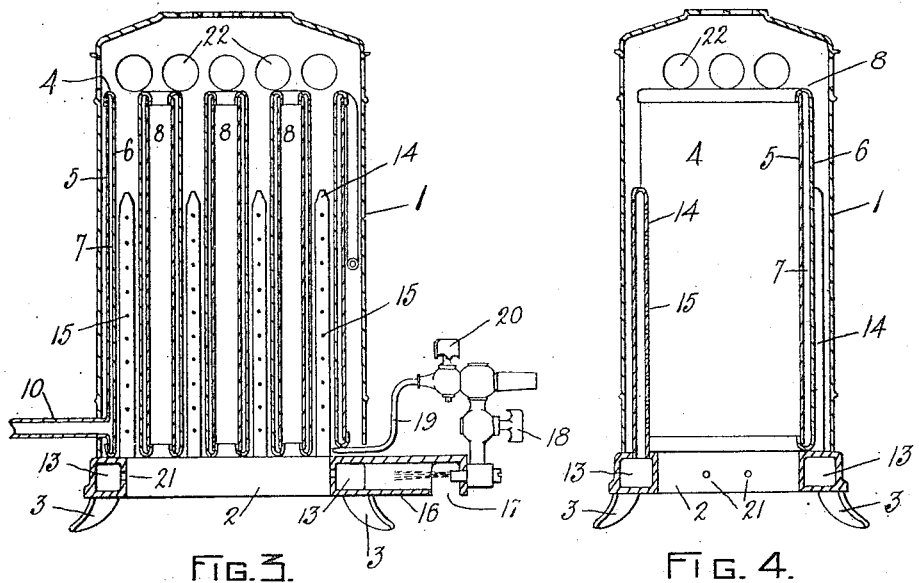

1,124,362.

Patented Jan. 12, 1915.

2 SHEETS—SHEET 2.

WITNESSES
C. G. Bradley.
J. H. Thurston

INVENTORS
Olivia W. Tucker, John R. Shirley,
By Kilworth H. Thurston,
ATTORNEY

UNITED STATES PATENT OFFICE.

OLIVIA W. TUCKER, OF EAST PROVIDENCE, AND JOHN R. SHIRLEY, OF PROVIDENCE, RHODE ISLAND.

PORTABLE WATER-HEATER.

1,124,362. Specification of Letters Patent. Patented Jan. 12, 1915.

Application filed March 27, 1911. Serial No. 617,078.

*To all whom it may concern:*

Be it known that we, OLIVIA W. TUCKER, of East Providence, county of Providence, and State of Rhode Island, and JOHN R. SHIRLEY, of Providence, county of Providence, and State of Rhode Island, have invented certain new and useful Improvements in Portable Water-Heaters; and we do hereby declare the following specification, taken in connection with the accompanying drawings, forming a part of the same. to be a full, clear, and exact description thereof.

The invention relates to an improved apparatus for rapidly heating water for domestic purposes and has for its object to simplify the same and render it more practical and effective.

To these ends the invention consists in the novel construction and combination of parts hereinafter shown and described and more particularly set forth in the claims.

In describing the invention in detail reference will be made to the accompanying drawings, in which—

Figures 6, 7:
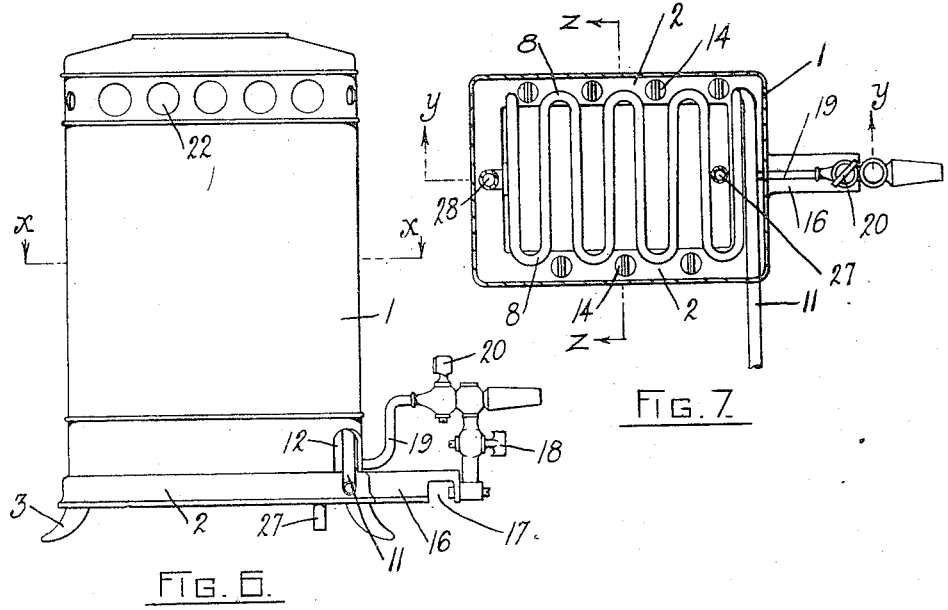
Figures 8, 9:
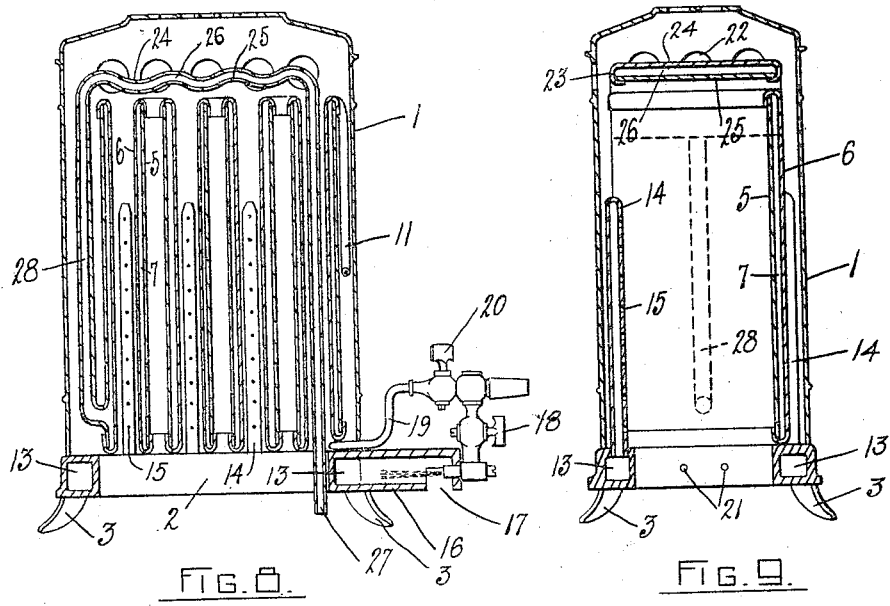

Figure 1 is a side elevation of our novel form of water heater. Fig. 2 is a cross section on line $u$—$u$, Fig. 1. Fig. 3 is a central vertical section on line $v$—$v$, Fig. 2. Fig. 4 is a central vertical section on line $w$—$w$, Fig. 3. Fig. 5 is a detail view. Fig. 6 is a side elevation of a modified construction. Fig. 7 is a cross section on line $x$—$x$, Fig. 6. Fig. 8 is a central vertical section on line $y$—$y$, Fig. 7. Fig. 9 is a central vertical section on line $z$—$z$, Fig. 7.

Referring to the drawings, 1 represents the outer shell or casing which is removably mounted upon a standard 2 provided with the supporting legs 3. Supported by the standard 2 is an elongated narrow water compartment 4 which is formed by two elongated sheets of metal 5 and 6 evenly spaced apart and joined together at their sides and ends by folding the edges of one wall over the corresponding edges of the other wall, as shown in Figs. 3 and 4. Said walls 5 and 6 are arranged parallel and in close proximity to each other so as to form a very narrow water-passage 7. The water compartment 4 is preferably constructed in the form of a scroll having several transverse folds or convolutions 8 extending alternately in opposite directions, as shown in Fig. 2. An inlet supply pipe 10 extends through a slot in the casing 1 and is connected to the water compartment 4 at one end near the bottom, and an outlet supply pipe 11 is connected to the other end of said compartment 4 at the top and extends out through a slot 12 in said casing 1.

The standard 2 is provided with a passage 13 extending around the same and supported by said standard 2, and communicating with said passage 13 is a series of Bunsen burners 14 which are arranged in an upright position at the open ends of the folds 8, as shown in Figs. 2 and 3, and are provided with a series of perforations 15 upon the inner sides facing the closed ends of the folds 8, as shown in Figs. 3 and 4. A gas inlet pipe 16 leads from the source of supply to the passage 13, and is provided with an air inlet opening 17 and a controlling cock 18. A pilot light burner 19 controlled by a cock 20 is preferably employed for lighting the Bunsen burners 14. The standard 2 is provided with a series of perforations 21 communicating with the passage 13 for the admission of air and the casing 1 is provided with a series of openings 22 for the escape of the consumed gases.

In the operation of the device the water is fed from any suitable source of supply by means of the inlet pipe 10 into the bottom of the water compartment 4 at one end and passes through the folds 8 of said compartment 4 in the form of a thin sheet and passes out at the top of the opposite end through the outlet pipe 11. As will be seen, the Bunsen burners 14 being arranged at the open end of each fold 8 and extending nearly to the top edge of said folds and the perforations 15 being on the inner side of said burners and opposite the closed ends of said folds 8, a flame of gas is applied to the entire surface of each side of each fold and against the closed ends thereof and the thin sheet of water passing through the compartment 4 will be quickly heated to a very high temperature.

Figs. 6, 7, 8, and 9 show a modified form of the device in which a second or supplemental water compartment 23 is arranged above the main water compartment 4. Said supplemental compartment 23 is formed in the same manner as the main compartment 4 of two elongated flat plates 24 and 25 of sheet metal secured together so as to from a narrow water passage 26, and bent into a series of horizontal wave-like bends, as shown in Fig. 8. Said supplemental compartment 23 is arranged at right angles to the compartment 4 and is provided with an inlet pipe 27 at one end which extends up through the standard 2 between two of the convolutions of the compartment 4, and with a pipe 28 at the opposite end which connects the supplemental compartment 23 with the main compartment 4. With this construction the heat from the Bunsen burners 14 rises up between the convolutions 8 and around the supplemental compartment 23, thereby raising the temperature of the water in said supplemental compartment 23 before it enters the main compartment 4.

It will be seen that the flame from the burners 14 contacts with every portion of the main water compartment 4 and with the entire under side of the supplemental compartment 23, and that therefore the water can be circulated very rapidly through the heater and still be raised to a very high degree of temperature.

What we claim as our invention and desire to secure by Letters Patent is:

1. In a device of the character described, the combination of a water-chamber formed of two sheets of metal of rectangular shape connected at their edges, spaced an even distance apart and bent into a series of transverse folds spaced apart from each other, an inlet-pipe connected to one end at the bottom, and an outlet-pipe connected to the opposite end at the top, and a burner at the open end of each of said folds.

2. In a device of the character described, the combination of a water-chamber formed of two sheets of metal connected at their edges and bent into a series of vertical folds spaced apart from each other, a standard arranged to support said water-chamber, a series of vertically arranged burners supported by said standard and extending between the folds of said water-chamber, and a series of flame openings in said burners on the side facing the closed end of each of said folds.

3. In a device of the character described, the combination of a main water-chamber formed of two sheets of metal connected at their edges and bent into a series of vertical folds, a supplemental water-chamber located above said main water-chamber and formed of two sheets of metal connected at their edges and bent into a series of horizontal wave-like bends, a pipe connecting one end of said supplemental chamber to the bottom portion of the corresponding end of said main water-chamber, an outlet-pipe extending from the top portion of the opposite end of said main chamber, an inlet pipe extending from the opposite end of said supplemental chamber down between two of the folds in said main chamber, and heat applying means between each of the folds in said main chamber.

OLIVIA W. TUCKER
JOHN R. SHIRLEY.

Witnesses:
W. H. Thurston,
J. H. Thurston.